(12) United States Patent
Tseng et al.

(10) Patent No.: US 12,219,192 B1
(45) Date of Patent: *Feb. 4, 2025

(54) GENERATING DETERMINISTIC DE-IDENTIFIED UNIQUE HOUSEHOLD IDENTIFIERS (UHIDS)

(71) Applicant: CSC Holdings, LLC, Bethpage, NY (US)

(72) Inventors: Kent Tseng, Westbury, NY (US); Wael Sabra, Forest Hills, NY (US); William Feininger, Palm Harbor, FL (US); Jeff Dittus, Narberth, PA (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,528

(22) Filed: Jun. 8, 2023

Related U.S. Application Data

(63) Continuation of application No. 17/576,504, filed on Jan. 14, 2022, now Pat. No. 11,711,560, which is a continuation of application No. 16/215,901, filed on Dec. 11, 2018, now Pat. No. 11,228,795.

(51) Int. Cl.
*H04N 21/258* (2011.01)
*H04N 21/2668* (2011.01)
(52) U.S. Cl.
CPC ... *H04N 21/25883* (2013.01); *H04N 21/2668* (2013.01)

(58) Field of Classification Search
CPC .............. H04N 21/25883; H04N 21/2668
See application file for complete search history.

(56) References Cited

U.S. PATENT DOCUMENTS

| | | | |
|---|---|---|---|
| 11,228,795 B1* | 1/2022 | Tseng | H04N 21/2668 |
| 11,711,560 B1* | 7/2023 | Tseng | H04N 21/2668 |
| | | | 725/35 |
| 2014/0379599 A1* | 12/2014 | Feininger | H04N 21/478 |
| | | | 705/325 |
| 2016/0105691 A1 | 4/2016 | Zucchetta | |
| 2019/0075344 A1* | 3/2019 | Brown | H04N 21/44224 |
| 2019/0087387 A1* | 3/2019 | Westmoreland | H04L 67/535 |
| 2021/0090025 A1 | 3/2021 | Bolton et al. | |

* cited by examiner

*Primary Examiner* — Kyu Chae
(74) *Attorney, Agent, or Firm* — Sterne, Kessler, Goldstein & Fox P.L.L.C.

(57) ABSTRACT

In an anonymous matching system, a demand-side service platform (DSP) may select segments to populate a target audience. A data warehouse platform and a multichannel video programming distributor (MVPD) platform ingest address lists, eliminate personally identifiable information (PII) from the address lists, and process the de-identified addresses to generate deterministic unique anonymous household identifiers (UHIDs). Households may be selected, for example, at the DSP's direction, to form a query request without exposing the PII. In response to the query request, the MVPD platform determines a matching UHID and includes a matching household attribute, such as an IP address or the like, in a query response without exposing the PII.

20 Claims, 5 Drawing Sheets

GENERATING DETERMINISTIC DE-IDENTIFIED UNIQUE HOUSEHOLD IDENTIFIERS (UHIDS)

CROSS-REFERENCE TO RELATED APPLICATION

This application is a continuation application of U.S. patent application Ser. No. 17/576,504, filed on Jan. 14, 2022, now U.S. Pat. No. 11,711,560, which is a continuation application of U.S. patent application Ser. No. 16/215,901, filed on Dec. 11, 2018, now U.S. Pat. No. 11,228,795, each of which is incorporated herein by reference in its entirety.

BACKGROUND

Service providers include multichannel video programming distributors (MVPDs) that provide television, video, internet and other content services to subscribers or users. Demand-side platforms include automated advertisement campaign management processes that enable advertisers to direct ad placements with MVPDs, for example, in real time. It is increasingly challenging for service providers such as MVPDs to engage with DSPs and auxiliary services while maintaining security of MVPD data, including subscriber data. In view of increasingly malicious and pervasive attempts to breach privacy data, global privacy laws have become increasingly rigid, putting arduous requirements on service providers to secure subscriber data. The security of personally identifiable information (PII) is essential as service providers are increasingly regulated and a single data breach can cause potentially catastrophic embarrassment and damages.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

DETAILED DESCRIPTION

Overview

Figure 1:
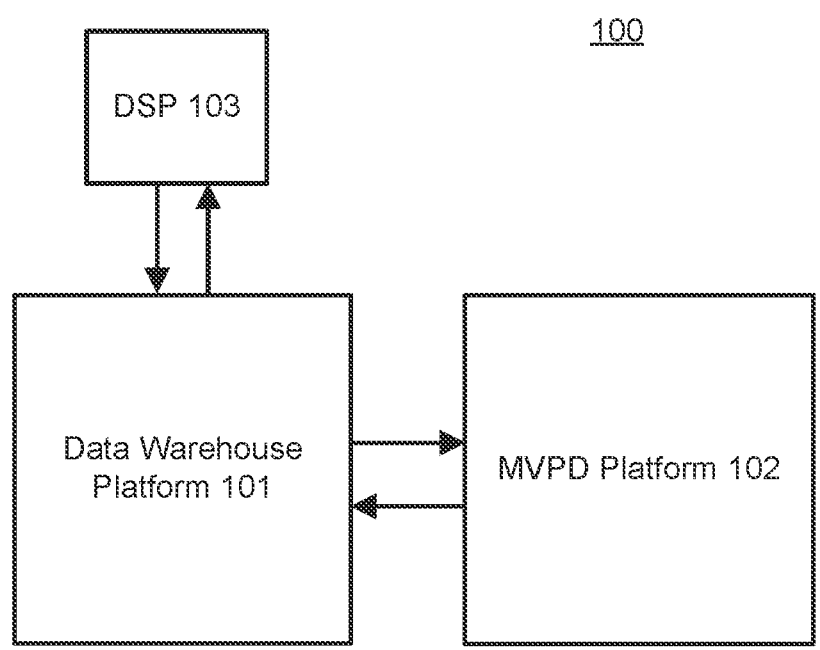
FIG. 1 is a diagram of infrastructure of an anonymous matching system (AMS) according to an exemplary embodiment of the present disclosure.

The systems and methods disclosed herein provide a demand-side platform (DSP) to target content, including advertisements for example, to MVPD subscribers. The DSP directs a campaign toward selected audience segments based on one or more criteria, including demographics or other segmentation data. Demographics, psychographics and segmentation data provides information on specific segments of the populace. This information may be nearly limitless and perpetually increasing. For example, such information may provide insights into consumers by informing the decision maker about their age, gender, marital status, home ownership, geographic location, political affiliation, and the like Demographic information may include media content (e.g., television content, internet content, or the like) that the populace has viewed. Psychographic information may include information regarding how consumers think and feel about issues, products, services, et. al. This is increasingly important to marketers.

In certain embodiments herein, the DSP may select, combine, or omit one or more data elements or datasets to populate a target audience segment from among the populace. The systems and methods enable a list of one or more matched internet protocol (IP) addresses corresponding to members of the target audience. Moreover, the embodiments described herein enable interaction between two or more platforms, such as an audience targeting platform and the MVPD platform, without potentially exposing PII. With the sensitivity of nearly every enterprise, particularly MVPDs and service providers, to PII breaches, it is essential to be protective of how such data is used or captured. The systems and methods herein enable the DSP, or other end user, to create the target audience in a deterministic manner but without exposing any PII. In the present disclosure, PII is not utilized in identifying members of the target audience. Instead, the members of the target audience are identified based on households of interest instead of the specific members of the households of interest. Thus, an anonymous matching system described herein returns IP addresses matched to households of interest to enable the DSP, or the other end user, to address the households of interest of the target audience.

In certain embodiments herein, audience lists with information about the households of interest can include demographic, psychographic and other segmentation data, physical address lists and potentially sensitive PII. In embodiments described in detail below, identifiers corresponding to the households of interest can be de-identified, i.e. stripped of any PII, to minimize the risk of abuse of such data, while still permitting data warehouses and service providers to communicate information about the households of interest, such as IP addresses to provide an example. The de-identified address lists may be converted into a cleansed and standardized address list that can be used as a key for a unique household identifier. A unique household identifier (UHID) may be generated to serve as a surrogate for the household for use within an audience targeting platform (such as a data warehouse, for example). The UHID may also be generated for use within an MVPD platform (or other service provider). For example, these UHIDs may be generated by performing a one-way hash function on the de-identified address lists. Thus, a data warehouse may be able to identify and store hundreds of millions of household identifiers, with every household (not individual) stored in a de-identified manner. Thus, the UHIDs cannot be reversed to identify the actual resident. Thereby, the target audience can be formed and reached without specifying the members of the target audience themselves and without exposing PII. Moreover, in embodiments herein, a DSP can be enabled to target content to every device and individual that resides in a household based on that household's postal or physical address.

Exemplary Anonymous Matching System (AMS)

FIG. 1 is a diagram of infrastructure of an anonymous matching system (AMS) according to an exemplary embodiment of the present disclosure. In some embodiments, an anonymous matching system (AMS) 100 may interact with content providers, advertisers, and the like, to execute delivery of content, including advertisements, programming, products, services and the like.

As illustrated in FIG. 1, the AMS 100 includes a data warehouse (DW) platform 101 and a multichannel video programming distributor (MVPD) platform 102. In embodiments herein, a demand-side platform (DSP) 103 can engage with the AMS 100 to direct the content to one or more targeted households. As to be described in more detail below, the DSP 103 selectively requests segmentation information of various households having one or more characteristics, parameters, and/or attributes from the DW platform 101. These various households having the one or more characteristics, parameters, and/or attributes are to be included within the one or more targeted households. The DW platform 101 selectively requests attribute information of the various households having one or more characteristics, parameters, and/or attributes from the MVPD platform 102. The segmentation information and the attribute information are to be described in more detail below. For example, the DSP 103 can request segmentation information and/or attribute for households having tuned to channel five at 10:00 PM.

As illustrated in FIG. 1, the DW platform 101 maintains the segmentation information associated with one or more households. The segmentation information can include a household address as well as available demographic, socio-economic and any other segmentation information. For example, the segmentation information can be related to a household and can involve or include age, gender, marital status, home ownership, geographic location, political affiliation, consumer activity, television, internet or other viewership information, and the like, associated with any resident or other person associated with the household address. As to be described in further detail below, the DW platform 101 generates deterministic de-identified unique household identifiers (UHIDs) corresponding to the one or more households and stores and/or communicates the segmentation information using these deterministic de-identified UHIDs. In an exemplary embodiment, the DW platform 101 stores the segmentation information as a listing which is indexed by deterministic de-identified UHIDs. As described above, the DW platform 101 receives requests for segmentation information and/or attribute information of various households having the one or more characteristics, parameters, and/or attributes from the DSP 103. The DW platform 101, in response to these requests, searches through the segmentation information associated with the one or more households to identify those households having the one or more characteristics, parameters, and/or attributes, for example, those households having tuned to channel five at 10:00 PM. Thereafter, the DW platform 101 can provide the deterministic de-identified UHIDs of those households having the one or more characteristics, parameters, and/or attributes to the DSP 103 and/or the MVPD platform 102.

As illustrated in FIG. 1, the MVPD platform 102 maintains the attribute information associated with one or more subscribers. Such attribute information can include, for example, an Internet Protocol (IP) address of a subscriber at the household address. In the exemplary embodiment illustrated in FIG. 1, this attribute information is stored within the MVPD platform 102 and/or communicated by the MVPD platform 102 anonymously. As to be described in further detail below, the MVPD platform 102 generates deterministic de-identified UHIDs corresponding to the one or more subscribers and stores and/or communicates the attribute information using these deterministic de-identified UHIDs. As described above, the MVPD platform 102 receives deterministic de-identified UHIDs of those households having the one or more characteristics, parameters, and/or attributes from the DW platform 101. The MVPD platform 102, in response to receiving these deterministic de-identified UHIDs, identifies deterministic de-identified UHIDs of one or more subscribers associated with the deterministic de-identified UHIDs of those households having the one or more characteristics, parameters, and/or attributes provided by the DW platform 101. Thereafter, the MVPD platform 102 searches through the attribute information to identify attribute information of the one or more subscribers associated with the deterministic de-identified UHIDs of those households having the one or more characteristics, parameters, and/or attributes provided by the DW platform 101. For example, MVPD platform 102 can identify attributes, for example IP addresses, associated with the respective households having tuned to channel five at 10:00 PM. Thereafter, the MVPD platform 102 can provide the attribute information of the one or more subscriber households to the DW platform 101 and/or the DSP 103. In an exemplary embodiment, the attribute information of the one or more subscriber households can be provided to the DSP 103 to allow the DSP 103 to direct the content to one or more targeted households.

As described above, the DW platform 101 and the MVPD platform 102 store and/or communicate the segmentation information and the attribute information, respectively, using deterministic de-identified UHIDs. These deterministic de-identified UHIDs allow the segmentation information and/or the attribute information to be stored and/or communicated anonymously without potentially exposing PII. For example, the deterministic de-identified UHIDs allow the segmentation information to be communicated from the DW platform 101 to the MVPD platform 102 and/or the DSP 103 without being able to identify the specific households having the one or more characteristics, parameters, and/or attributes provided by the DW platform 101. As another example, the deterministic de-identified UHIDs allow the attribute information to be communicated from the MVPD platform 102 to the DW platform 101 and/or the DSPC 103 without being able to identify the specific subscribers having the attribute information.

Exemplary Embodiment of the AMS

Figure 2:
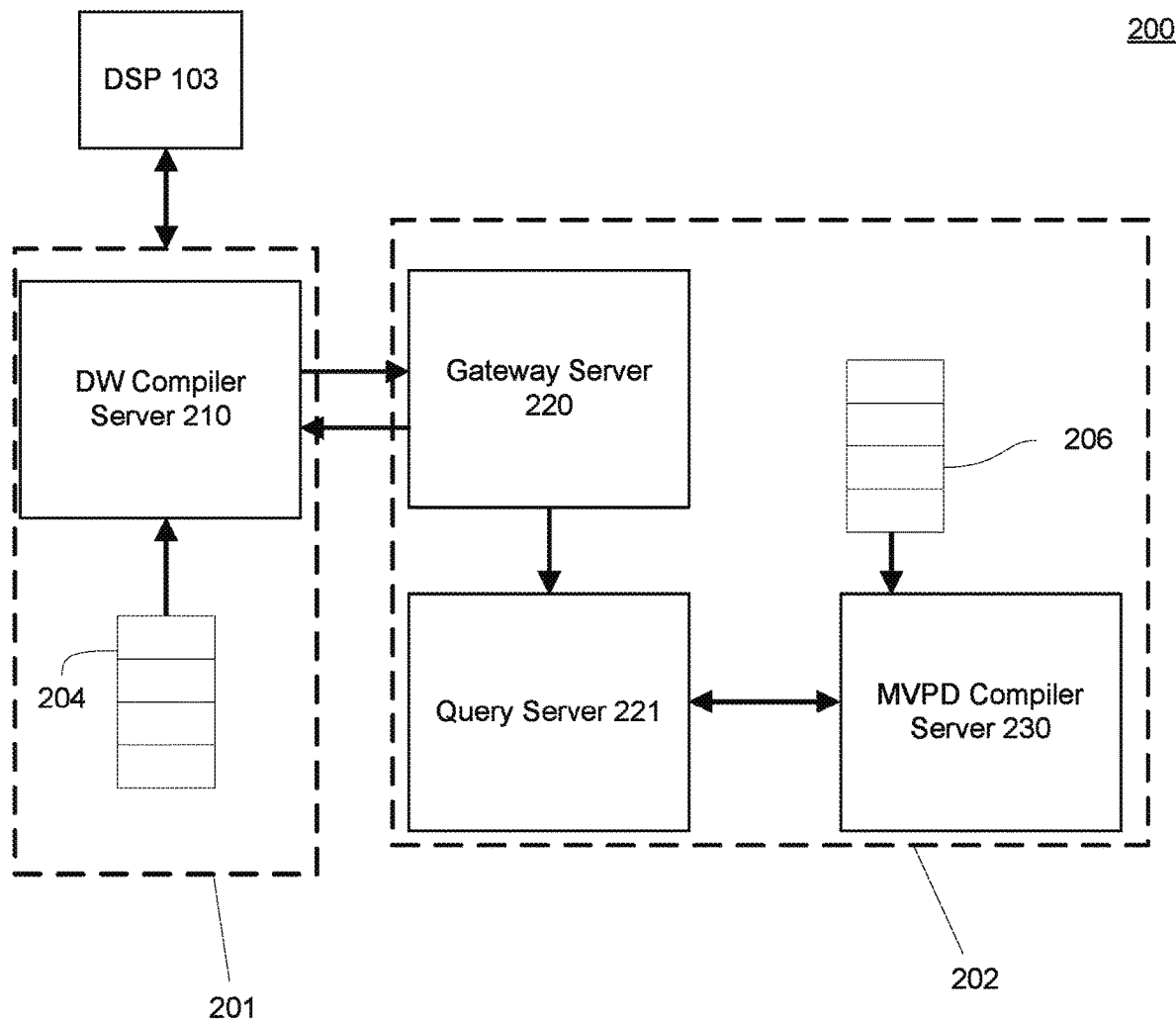
FIG. 2 is a diagram of an exemplary embodiment of the anonymous matching system (AMS) according to an exemplary embodiment of the present disclosure.

FIG. 2 is a diagram of an exemplary embodiment of the anonymous matching system (AMS) according to an exemplary embodiment of the present disclosure. An anonymous matching system (AMS) 200 stores and/or communicates the segmentation information and the attribute information, respectively, as described above using deterministic de-identified UHIDs in a substantially similar manner as described above in FIG. 1. These deterministic de-identified UHIDs allow the segmentation information and/or the attribute information to be stored and/or communicated anonymously without potentially exposing PII. In the exemplary embodiment illustrated in FIG. 2, the AMS 200 includes the DSP 103, a data warehouse platform 201, and a multichannel video programming distributor (MVPD) platform 202. The data warehouse platform 201 and the MVPD platform 202 can represent exemplary embodiments of the DW platform 101 and the MVPD platform 102 as described above in FIG. 1.

The DW platform 201 maintains the segmentation information associated with the one or more households in a substantially similar manner the DW platform 201 as described above in FIG. 1. In the exemplary embodiment illustrated in FIG. 2, the DW platform 201 can include a memory device 204 and a DW compiler server 210. As illustrated in FIG. 2, the memory device 204 stores the segmentation information, as described above in FIG. 1, associated with one or more households. This segmentation information is stored within the memory device 204 anonymously. As to be described in further detail below, the DW compiler server 210 generates deterministic de-identified unique household identifiers (UHIDs) corresponding to the one or more households and stores and/or communicates the segmentation information using these deterministic de-identified UHIDs. In an exemplary embodiment, the memory device 204 stores the segmentation information as a listing which is indexed by deterministic de-identified UHIDs. The DW compiler server 210, in response to receiving a request for segmentation information, searches through the segmentation information stored in the memory device 204 to identify segmentation information of those households having one or more characteristics, parameters, and/or attributes identified in the request. Thereafter, the DW compiler server 210 can provide the deterministic de-identified UHIDs of those households having the one or more characteristics, parameters, and/or attributes to the DSP 103 and/or the MVPD platform 202.

The MVPD platform 202 maintains the attribute information associated with one or more subscribers in a substantially similar manner the MVPD platform 102 as described above in FIG. 1. In the exemplary embodiment illustrated in FIG. 2, the MVPD platform 102 can include a memory device 206 and a MVPD complier server 230. As illustrated in FIG. 2, the memory device 206 stores the attribute information, as described above in FIG. 1, associated with one or more subscribers. This attribute information is stored within the memory device 206 anonymously. As to be described in further detail below, the MVPD complier server 230 generates deterministic de-identified UHIDs corresponding to the one or more subscribers and stores and/or communicates the attribute information using these deterministic de-identified UHIDs. In an exemplary embodiment, the memory device 206 stores the attribute information associated with the one or more subscribers as a listing which is indexed by deterministic de-identified UHIDs. As described above, the MVPD complier server 230 receives deterministic de-identified UHIDs of those households having the one or more characteristics, parameters, and/or attributes from the DW platform 201. The MVPD complier server 230, in response to receiving a request for deterministic de-identified UHIDs, searches through the attribute information stored in the memory device 206 to identify deterministic de-identified UHIDs of one or more subscribers associated with the deterministic de-identified UHIDs of those households having the one or more characteristics, parameters, and/or attributes provided by the DW platform 201. Thereafter, the DW compiler server 210 can provide the attribute information of the one or more subscriber households to the DSP 103 and/or the DW platform 201.

In some situations, the MVPD platform 202 can further include a query server 221 and/or a gateway server 220 to provide additional security measures for protecting the attribute information is stored within the memory device 206. Although the query server 221 and/or the gateway server 220 are illustrated as being within the MVPD platform 202 in FIG. 2, the query server 221 and/or the gateway server 220 can be in a location remote from the MVPD complier server 230 which can be operated by a third party, such as a cloud-based service. The gateway server 220 operates as an intermediary between DW platform 201 and the MVPD platform 202. In an exemplary embodiment, the gateway server 220 provides control over the attribute information communicated to the DSP 103 and/or the DW platform 201 to ensure the attribute information does not include any personally identifiable information (PII) that can be used to identify the specific subscribers having the attribute information communicated to the DSP 103 and/or the DW platform 201. For example, the gateway server 220 can scan the attribute information to be communicated to the DSP 103 and/or the DW platform 201 for the PII. In this example, the gateway server 220 can send the MVPD complier server 230 and/or an administrator of the MVPD platform 202 a notification that the attribute information includes the PII in response to detecting the PII within the attribute information. The query server 221 sends a request or query to the MVPD complier server 230 for attribute information corresponding to the deterministic de-identified UHIDs of those households having the one or more characteristics, parameters, and/or attributes provided by the DW platform 201. In an exemplary embodiment, the MVPD platform 202 can service multiple DSPs 103 and/or multiple DW platforms 201 with each of the multiple DW platforms 201 requesting various deterministic de-identified UHIDs of households. In the exemplary embodiment, the query server 221 can ensure the various attribute information corresponding to the various deterministic de-identified UHIDs of households is routed to the proper DW platform 201 from among the multiple DSPs 103 and/or multiple DW platforms 201. Thereby, the DSP 103 is enabled to target content to devices and individuals that reside in the households corresponding to the deterministic de-identified UHIDs and associated attribute information.

Exemplary Methods for Generating De-Identified Unique Household Identifiers (UHIDS)

Figure 3:
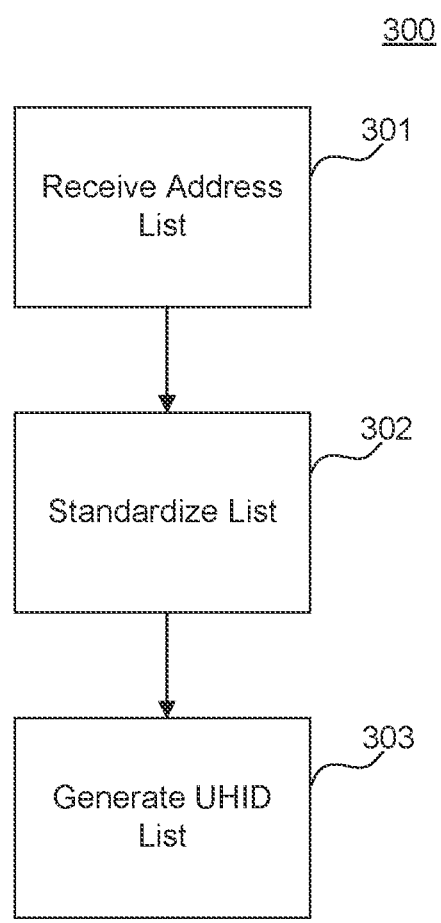
FIG. 3 is a flowchart showing an exemplary operational description to generate deterministic de-identified unique household identifiers (UHIDs) according to an exemplary embodiment of the present disclosure.

FIG. 3 is a flowchart showing an exemplary operational description to generate deterministic de-identified unique household identifiers (UHIDs) according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for the MVPD platform 102, MVPD platform 202, the DW platform 101, and/or the DW platform 201 to generate deterministic de-identified UHIDs as described above in FIG. 1 and FIG. 2. Unlike a conventional operation that may prepare a list of unique identifiers based on PII, the exemplary operational control flow 300 converts addresses, such as physical addresses, postal addresses, or the like, into a standardized, de-identified, one-way hashed list of unique household identifiers as to be described in further detail below that does not reveal the identity of individuals associated with a household. Thereby, the creation of a one-way hashed list of deterministic unique household identifiers can permit a platform to adhere to strict privacy requirements, minimizing the risk of identity theft, privacy breaches, and the like.

At operation 301, the exemplary operational control flow 300 receives a list of addresses of the one or more households, such as a list of physical or postal addresses of the one or more households. This list of addresses of the one or more households can include street addresses of the one or more households and postal zip codes of the one or more households. In some situations, the list of physical addresses can include personally identifiable information (PII) identifying one or more members of the one or more households, such as names of the one or more members of the one or more households to provide an example. In this situation, the exemplary operational control flow 300 can remove the PII from the list of physical addresses of the one or more households at operation 301. For example, the exemplary operational control flow 300 can receive the list of physical addresses of the one or more households that includes information, including a resident and residential address "John Smith, 100 Main Street, 12345." In this example, the exemplary operational control flow 300 can remove any PII, namely "John Smith."

At operation 302, the exemplary operational control flow 300 standardizes the list of physical addresses received in operation 301. Specifically, the exemplary operational control flow 300 can correct and/or standardize addresses from the list of physical addresses received in operation 301 to ensure uniformity among the addresses from the list of physical addresses received in operation 301. For example, the exemplary operational control flow 300 can standardize capitalization and formatting, insert omitted information, correct spelling errors, correct abbreviations, and the like. As another example, the exemplary operational control flow 300 can interact with a third-party API, such as an API provided by a postal service (e.g., the United States Postal Service) to standardize the list of physical addresses received in operation 301. From example above, the exemplary operational control flow 300 can standardize the physical address "100 Main Street, 12345" to be "100 Main Street, Jonestown, AB 12345-6789" at operation 302.

At operation 303, the exemplary operational control flow 300 generates deterministic de-identified anonymous UHIDs for the one or more households from the standardized list of physical addresses from operation 302. The exemplary operational control flow 300 can perform a cryptographic function (e.g., generating a secure one-way hash algorithm such as SHA1) on the standardized list of physical addresses from operation 302 to generate the deterministic de-identified UHIDs for the one or more households. From the example above, the exemplary operational control flow 300 performs the cryptographic function on the standardized address of be "100 Main Street, Jonestown, AB 12345-6789" to transform the standardized address to a unique household identifier, e.g., "A7C666FA7B16D3508E2 . . . ."

Figure 4A:
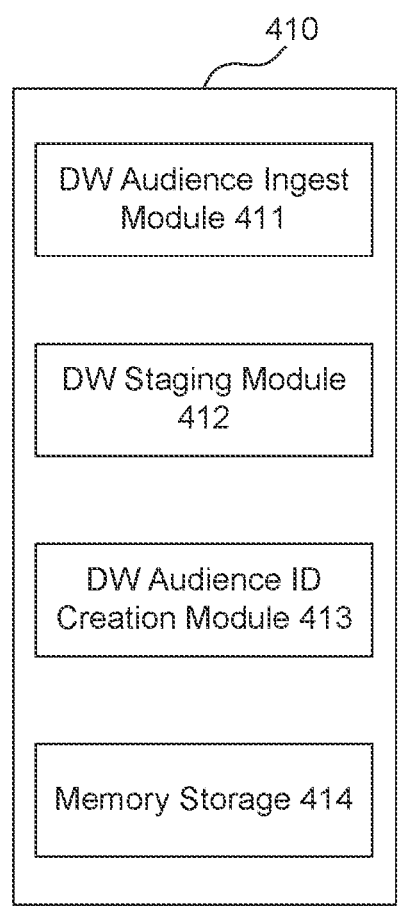
FIG. 4A is a diagram of an exemplary embodiment of DW compiler server that can be implemented within the AMS according to an exemplary embodiment of the present disclosure.

Exemplary Embodiment of the DW Compiler Server that can be Implemented within the AMS FIG. 4A is a diagram of an exemplary embodiment of DW compiler server that can be implemented within the AMS according to an exemplary embodiment of the present disclosure. In the exemplary embodiment illustrated in FIG. 4A, a DW compiler server 410 generates deterministic de-identified unique household identifiers (UHIDs) corresponding to the one or more households and stores the segmentation information using these deterministic de-identified UHIDs as described above. As illustrated in FIG. 4A, the DW compiler server 410 includes a DW audience ingest module 411, a DW staging module 412, an DW audience identifier (ID) creation module 413, and a memory storage 414. For purposes of this discussion, the term "module" shall be understood to include software, firmware, or hardware (such as one or more circuits, microchips, digital storage systems, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner, including cloud-based storage and processing. The DW compiler server 410, as illustrated in FIG. 4A, can represent an exemplary embodiment of the DW compiler server 210 as described above in FIG. 2.

The DW audience ingest module 411 receives segmentation information, some which can potentially include including PII. For example, the DW audience ingest module 411 receives can receive the segmentation information from at least one third party source. The PII may include residential address lists and can further include demographic information, socioeconomic information, interests, financial information and other segmentation data. In the exemplary embodiment illustrated in FIG. 4A, the segmentation information can include a list of physical addresses of the one or more households, such as a list of physical addresses of the one or more households along with one or more characteristics, parameters, and/or attributes corresponding to the physical addresses. This list of physical addresses of the one or more households can include street addresses of the one or more households and postal zip codes of the one or more households. In some situations, the list of physical addresses can include personally identifiable information (PII) identifying one or more members of the one or more households, such as names of the one or more members of the one or more households to provide an example. In this situation, the DW audience ingest module 411 removes the PII from the list of physical addresses of the one or more households. For example, the DW audience ingest module 411 can receive the list of physical addresses of the one or more households that includes information, including a resident and residential address "John Smith, 100 Main Street, 12345." In this example, the DW audience ingest module 411 removes any PII, namely "John Smith."

The DW staging module 412 standardizes the list of physical addresses received from the DW audience ingest module 411 to provide segmentation information for storage in the memory storage 414. Specifically, the DW staging module 412 can correct and/or standardize addresses from the list of physical addresses received from the DW audience ingest module 411 to ensure uniformity among the addresses from the list of physical addresses received. For example, the DW staging module 412 can standardize capitalization and formatting, insert omitted information, correct spelling errors, correct abbreviations, and the like. As another example, the DW staging module 412 can interact with a third-party API, such as an API provided by a postal service (e.g., the United States Postal Service) to standardize the list of physical addresses received in operation 301. From example above, the DW staging module 412 can standardize the physical address "100 Main Street, 12345" to be "100 Main Street, Jonestown, AB 12345-6789".

The DW audience ID creation module 413 generates deterministic, anonymous de-identified UHIDs for the one or more households from the standardized list of physical addresses from the DW staging module 412. The DW audience ID creation module 413 can perform a cryptographic function (e.g., generating a secure one-way hash algorithm such as SHA1) on the standardized list of physical addresses from the DW staging module 412 to generate the deterministic, anonymous de-identified UHIDs for the one or more households. From the example above, the DW audience ID creation module 413 performs the cryptographic function on the standardized address of be "100 Main Street, Jonestown, AB 12345-6789" to transform the standardized address to a unique household identifier, e.g., "A7C666FA7B16D3508E2 . . . " In some embodiments, the DW audience ID creation module 413 can provide the deterministic, anonymous de-identified UHIDs for the one or more households as a first UHID list to memory storage 414 for storage. In these exemplary embodiments, the DW audience ID creation module 413 can thereafter retrieve the first UHID list from the memory storage 414 and create a second UHID list based thereon. For example, the DW audience ID creation module 413 can perform a second cryptographic function (e.g., generating a secure hash algorithm) on the first UHID list to generate the second UHID list for the one or more households.

The memory storage 414 stores the segmentation information from the DW staging module 412 indexed by the deterministic de-identified unique household identifiers (UHIDs) for the one or more households from the DW audience ID creation module 413.

Figure 4B:
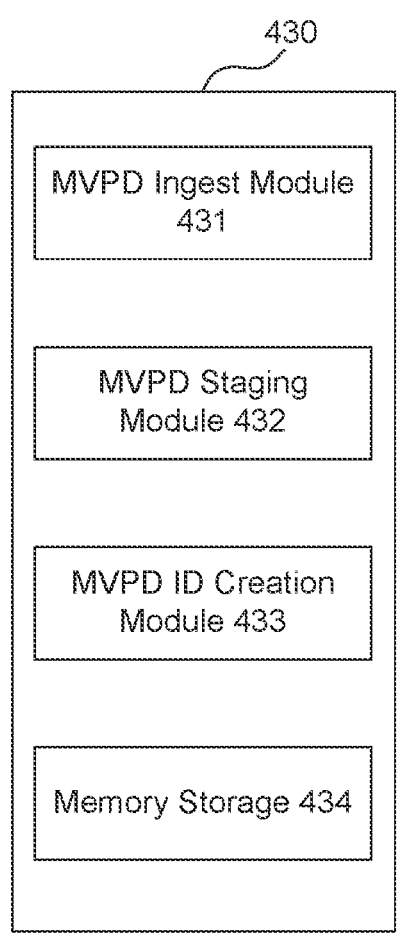
FIG. 4B is a diagram of an exemplary embodiment of DW compiler server that can be implemented within the AMS according to an exemplary embodiment of the present disclosure.

Exemplary Embodiment of the MVPD Compiler Server that can be Implemented within the AMS FIG. 4B is a diagram of an exemplary embodiment of DW compiler server that can be implemented within the AMS according to an exemplary embodiment of the present disclosure. In the exemplary embodiment illustrated in FIG. 4B, a MVPD compiler server 430 generates deterministic, anonymous de-identified UHIDs corresponding to one or more subscribers and stores and/or communicates the attribute information using these deterministic de-identified UHIDs. In an exemplary embodiment, the memory device 206 stores the attribute information associated with the one or more subscribers as a listing which is indexed by deterministic, anonymous de-identified UHIDs. The MVPD compiler server 430, in response to receiving a request for the attribute information, searches through the attribute information to identify attribute information of those households having one or more characteristics, parameters, and/or attributes identified in the request as described above. As illustrated in FIG. 4B, the MVPD compiler server 430 includes an MVPD ingest module 431, an MVPD staging module 432, an MVPD identifier (ID) creation module 433, and a memory storage 434. The MVPD compiler server 430, as illustrated in FIG. 4B, can represent an exemplary embodiment of the MVPD complier server 230 as described above in FIG. 2.

The MVPD ingest module 431 receives attribute information, some which can potentially include personally identifiable information (PII). In some embodiments, the MVPD ingest module 431 can receive the attribute information from at least one third party source. In the exemplary embodiment illustrated in FIG. 4B, the attribute information can include a list of physical addresses of the one or more households, such as a list of physical addresses of the one or more households along with one or more non-PII attributes, for example Internet Protocol (IP) addresses, corresponding to the physical addresses. This list of physical addresses of the one or more households can include street addresses of the one or more households and postal zip codes of the one or more households. In some situations, the list of physical addresses can include personally identifiable information (PII) identifying one or more members of the one or more households, such as names of the one or more members of the one or more households to provide an example. In this situation, the MVPD ingest module 431 can remove the PII, such as such as the names of the one or more members of the one or more households, from the list of physical addresses of the one or more households. For example, the MVPD ingest module 431 can receive the list of physical addresses of the one or more households that includes information, including a resident and residential address "John Smith, 100 Main Street, 12345." In this example, the MVPD ingest module 431 can remove any PII, namely "John Smith."

The MVPD staging module 432 standardizes the list of physical addresses received from the MVPD ingest module 431 to provide attribute information for storage in the data warehousing module 434. Specifically, the MVPD staging module 432 can correct and/or standardize addresses from the list of physical addresses received from the MVPD ingest module 431 to ensure uniformity among the addresses from the list of physical addresses received. For example, the MVPD staging module 432 can standardize capitalization and formatting, insert omitted information, correct spelling errors, correct abbreviations, and the like. As another example, the MVPD staging module 432 can interact with a third-party API, such as an API provided by a postal service (e.g., the United States Postal Service) to standardize the list of physical addresses received in operation 301. From example above, the MVPD staging module 432 can standardize the physical address "100 Main Street, 12345" to be "100 Main Street, Jonestown, AB 12345-6789".

The MVPD ID creation module 433 generates deterministic, anonymous de-identified unique household identifiers (UHIDs) for the one or more households from the standardized list of physical addresses from the MVPD staging module 432. The MVPD ID creation module 433 can perform a cryptographic function (e.g., generating a secure hash algorithm such as SHA1) on the standardized list of physical addresses from the MVPD staging module 432 to generate the deterministic de-identified UHIDs for the one or more households. From the example above, the MVPD ID creation module 433 performs the cryptographic function on the standardized address of be "100 Main Street, Jonestown, AB 12345-6789" to transform the standardized address to a unique household identifier, e.g., "A7C666FA7B16D3508E2 . . . ."

The memory storage 434 stores the attribute information from the MVPD staging module 432 indexed by the deterministic, anonymous de-identified unique household identifiers (UHIDs) for the one or more households from the MVPD ID creation module 433.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to be limiting. Rather, the scope of the disclosure is defined only in accordance with the following claims and their equivalents. It is to be appreciated that the Detailed Description section, and not the Abstract section, is intended to be used to interpret the claims. The Abstract section can be set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; cloud or third party storage services; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A system, comprising:
a first electronic platform, having a first server and a first memory device, configured to:
receive a request for information relating to a household,
identify a first deterministic de-identified unique household identifier (UHID) of the household,
search a plurality of household information for household information that is associated with the first deterministic de-identified UHID; and
a second electronic platform, having a second server and a second memory device, configured to:
receive the first deterministic de-identified UHID from the first electronic platform,
identify a second deterministic de-identified UHID of a subscriber within the household that is associated with the first deterministic de-identified UHID,
search a plurality of subscriber information for subscriber information that is associated with the second deterministic de-identified UHID, and
provide the subscriber information and the second deterministic de-identified UHID to the first electronic platform,
wherein the first electronic platform is further configured to provide the household information, the first deterministic de-identified UHID, the subscriber information, and the second deterministic de-identified UHID in response to the request for information.

2. The system of claim 1, wherein the first electronic platform is further configured to store the plurality of household information as a first listing that is indexed by a plurality of first deterministic de-identified UHIDs, and
wherein the second electronic platform is further configured to store the plurality of subscriber information as a second listing that is indexed by a plurality of second deterministic de-identified UHIDs.

3. The system of claim 2, wherein the first electronic platform is further configured to store the plurality of household information anonymously such that specific households that are associated with the plurality of household information cannot be specifically identified from the plurality of first deterministic de-identified UHIDs, and
wherein the second electronic platform is further configured to store the plurality of subscriber information anonymously such that specific subscribers that are associated with the plurality of subscriber information cannot be specifically identified from the plurality of second deterministic de-identified UHIDs.

4. The system of claim 1, wherein the first electronic platform is configured to:
receive the request for information relating to the household having one or more characteristics, parameters, or attributes;

identify the first deterministic de-identified UHID of the household having the one or more characteristics, parameters, or attributes; and provide the first deterministic de-identified UHID of the household having the one or more characteristics, parameters, or attributes to the second electronic platform.

5. The system of claim 1, wherein the first electronic platform is further configured to:

receive the plurality of household information, at least some of the plurality of household information including personally identifiable information (PII) specifically identifying households associated with the at least some of the plurality of household information; and remove the PII specifically identifying households from the at least some of the plurality of household information, and wherein the second electronic platform is further configured to:

receive the plurality of subscriber information, at least some of the plurality of subscriber information including PII specifically identifying subscribers associated with the at least some of the plurality of subscriber information; and remove the PII specifically identifying subscribers from the at least some of the plurality of subscriber information.

6. The system of claim 5, wherein the first electronic platform is further configured to:

scan the plurality of household information for the PII specifically identifying households that are associated with the plurality of household information; and generate a first notification in response to detecting the PII within the plurality of household information, and wherein the second electronic platform is further configured to:

scan the plurality of subscriber information for the PII specifically identifying subscribers that are associated with the plurality of subscriber information; and generate a second notification in response to detecting the PII within the plurality of subscriber information.

7. The system of claim 1, wherein the first electronic platform comprises a data warehouse platform that is configured to maintain the plurality of household information that is associated with a plurality of households that receive content services, and wherein the second electronic platform comprises a multichannel video programming distributor (MVPD) platform that is configured to maintain the plurality of subscriber information that is associated with a plurality of subscribers that receive the content services.

8. A method, comprising:

receiving, by an anonymous matching system (AMS) having a server and a memory device, a request for information relating to a household;

identifying, by the AMS, a first deterministic de-identified unique household identifier (UHID) of the household;

searching, by the AMS, a plurality of household information for household information that is associated with the first deterministic de-identified UHID;

identifying, by the AMS, a second deterministic de-identified UHID of a subscriber within the household that is associated with the first deterministic de-identified UHID;

searching, by the AMS, a plurality of subscriber information for subscriber information that is associated with the second deterministic de-identified UHID; and providing, by the AMS, the household information, the first deterministic de-identified UHID, the subscriber information, and the second deterministic de-identified UHID in response to the request for information.

9. The method of claim 8, further comprising:

storing, by the AMS, the plurality of household information as a first listing that is indexed by a plurality of first deterministic de-identified UHIDs; and storing, by the AMS, the plurality of subscriber information as a second listing that is indexed by a plurality of second deterministic de-identified UHIDs.

10. The method of claim 9, wherein the storing the plurality of household information as the first listing comprises storing the plurality of household information anonymously such that specific households that are associated with the plurality of household information cannot be specifically identified from the plurality of first deterministic de-identified UHIDs, and wherein the storing the plurality of subscriber information as the second listing comprises storing the plurality of subscriber information anonymously such that specific subscribers that are associated with the plurality of subscriber information cannot be specifically identified from the plurality of second deterministic de-identified UHIDs.

11. The method of claim 8, wherein the receiving comprises receiving the request for information relating to the household having one or more characteristics, parameters, or attributes, and wherein the identifying comprises identifying the first deterministic de-identified UHID of the household having the one or more characteristics, parameters, or attributes.

12. The method of claim 8, further comprising:

receiving the plurality of household information, at least some of the plurality of household information including personally identifiable information (PII) specifically identifying households associated with the at least some of the plurality of household information;

removing the PII specifically identifying households from the at least some of the plurality of household information;

receiving the plurality of subscriber information, at least some of the plurality of subscriber information including PII specifically identifying subscribers associated with the at least some of the plurality of subscriber information; and removing the PII specifically identifying subscribers from the at least some of the plurality of subscriber information.

13. The method of claim 12, further comprising:

scanning the plurality of household information for the PII specifically identifying households that are associated with the plurality of household information;

generating a first notification in response to detecting the PII within the plurality of household information;

scanning the plurality of subscriber information for the PII specifically identifying subscribers that are associated with the plurality of subscriber information; and generating a second notification in response to detecting the PII within the plurality of subscriber information.

14. The method of claim 8, further comprising:

maintaining, by a data warehouse platform with the AMS, the plurality of household information that is associated with a plurality of households that receive content services; and maintaining, by a multichannel video programming distributor (MVPD) with the AMS, the plurality of subscriber information that is associated with a plurality of subscribers that receive the content services.

15. A system for communicating information anonymously without exposing personally identifiable information (PII), the system comprising:
a data warehouse platform, having a first server and a first memory device, configured to:
receive a request for information relating to a household having one or more characteristics, parameters, or attributes,
search a plurality of household information for household information that is associated with a first deterministic de-identified unique household identifier (UHID) of the household having one or more characteristics, parameters, or attributes; and
a multichannel video programming distributor (MVPD) platform, having a second server and a second memory device, configured to:
receive the first deterministic de-identified UHID from the data warehouse platform,
search a plurality of subscriber information for subscriber information that is associated with a second deterministic de-identified UHID of a subscriber within the household having one or more characteristics, parameters, or attributes that are associated with the first deterministic de-identified UHID, and
provide the subscriber information and the second deterministic de-identified UHID to the data warehouse platform,
wherein the data warehouse platform is further configured to provide the household information, the first deterministic de-identified UHID, the subscriber information, and the second deterministic de-identified UHID in response to the request for information.

16. The system of claim 15, wherein the data warehouse platform is further configured to store the plurality of household information as a first listing that is indexed by a plurality of first deterministic de-identified UHIDs, and
wherein the MVPD platform is further configured to store the plurality of subscriber information as a second listing that is indexed by a plurality of second deterministic de-identified UHIDs.

17. The system of claim 16, wherein the data warehouse platform is further configured to store the plurality of household information anonymously such that specific households that are associated with the plurality of household information cannot be specifically identified from the plurality of first deterministic de-identified UHIDs, and
wherein the MVPD platform is further configured to store the plurality of subscriber information anonymously such that specific subscribers that are associated with the plurality of subscriber information cannot be specifically identified from the plurality of second deterministic de-identified UHIDs.

18. The system of claim 15, wherein the data warehouse platform is further configured to:
receive the plurality of household information, at least some of the plurality of household information including personally identifiable information (PII) specifically identifying households associated with the at least some of the plurality of household information; and
remove the PII specifically identifying households from the at least some of the plurality of household information, and
wherein the MVPD platform is further configured to:
receive the plurality of subscriber information, at least some of the plurality of subscriber information including PII specifically identifying subscribers associated with the at least some of the plurality of subscriber information; and
remove the PII specifically identifying subscribers from the at least some of the plurality of subscriber information.

19. The system of claim 18, wherein the data warehouse platform is further configured to:
scan the plurality of household information for the PII specifically identifying households that are associated with the plurality of household information; and
generate a first notification in response to detecting the PII within the plurality of household information, and
wherein the MVPD platform is further configured to:
scan the plurality of subscriber information for the PII specifically identifying subscribers that are associated with the plurality of subscriber information; and
generate a second notification in response to detecting the PII within the plurality of subscriber information.

20. The system of claim 15, wherein the data warehouse platform is configured to maintain the plurality of household information that is associated with a plurality of households that receive content services, and
wherein the MVPD platform is configured to maintain the plurality of subscriber information that is associated with a plurality of subscribers that receive the content services.

* * * * *